US012577370B2

(12) United States Patent
Power et al.

(10) Patent No.: US 12,577,370 B2
(45) Date of Patent: Mar. 17, 2026

(54) NON-DUST BLEND

(71) Applicant: SI Group, Inc., The Woodlands, TX (US)

(72) Inventors: Maurice Power, Greater Manchester (GB); Vikram Chouk, Swindon (GB)

(73) Assignee: SI Group, Inc., The Woodlands, TX (US)

( * ) Notice: Subject to any disclaimer, the term of this patent is extended or adjusted under 35 U.S.C. 154(b) by 614 days.

(21) Appl. No.: 17/795,902

(22) PCT Filed: Jan. 27, 2021

(86) PCT No.: PCT/EP2021/051888
§ 371 (c)(1),
(2) Date: Jul. 28, 2022

(87) PCT Pub. No.: WO2021/151961
PCT Pub. Date: Aug. 5, 2021

(65) Prior Publication Data
US 2023/0090780 A1      Mar. 23, 2023

(30) Foreign Application Priority Data
Jan. 29, 2020    (GB) ..................................... 2001250

(51) Int. Cl.
| | |
|---|---|
| *C08K 3/32* | (2006.01) |
| *C08K 3/22* | (2006.01) |
| *C08K 3/30* | (2006.01) |
| *C08K 5/098* | (2006.01) |
| *C08K 5/13* | (2006.01) |
| *C08K 5/523* | (2006.01) |

(52) U.S. Cl.
CPC .................. *C08K 3/32* (2013.01); *C08K 3/22* (2013.01); *C08K 3/30* (2013.01); *C08K 5/098* (2013.01); *C08K 5/13* (2013.01); *C08K 5/523* (2013.01)

(58) Field of Classification Search
None
See application file for complete search history.

(56) References Cited

U.S. PATENT DOCUMENTS

| | | | |
|---|---|---|---|
| 3,644,536 A | 2/1972 | Bafford | |
| 4,187,212 A | 2/1980 | Linhart et al. | |
| 4,282,141 A | 8/1981 | Minagawa et al. | |
| 4,290,941 A | 9/1981 | Zinke et al. | |
| 4,312,818 A | 1/1982 | Maul et al. | |
| 4,348,308 A | 9/1982 | Minagawa et al. | |
| 4,360,617 A | 11/1982 | Mueller et al. | |
| 4,829,112 A | 5/1989 | Ishii et al. | |
| 4,957,956 A * | 9/1990 | Neri ..................... | C08K 5/1345 |
| | | | 252/400.24 |
| 4,985,481 A | 1/1991 | Neri et al. | |
| 5,247,118 A | 9/1993 | Blosser et al. | |
| 5,487,856 A | 1/1996 | Saraf | |
| 5,597,857 A | 1/1997 | Thibaut et al. | |
| 5,844,042 A | 12/1998 | Neri et al. | |
| 6,033,600 A | 3/2000 | Henkins et al. | |
| 6,051,671 A | 4/2000 | Hay et al. | |
| 6,444,836 B1 | 9/2002 | Hess et al. | |
| 6,596,198 B1 * | 7/2003 | Semen ................. | C08K 5/0008 |
| | | | 252/400.24 |
| 6,747,167 B2 | 6/2004 | Enlow et al. | |
| 7,135,511 B2 | 11/2006 | Battiste et al. | |
| 7,468,410 B2 | 12/2008 | Chafin et al. | |
| 7,648,410 B2 | 1/2010 | Choi et al. | |
| 7,888,414 B2 | 2/2011 | Gelbin et al. | |
| 8,048,946 B2 * | 11/2011 | Hill ........................ | C08K 5/524 |
| | | | 524/153 |
| 8,258,214 B2 * | 9/2012 | Zahalka ................. | C08K 5/526 |
| | | | 524/384 |
| 11,879,050 B2 | 1/2024 | Ebenezer et al. | |
| 2002/0117651 A1 | 8/2002 | Semen | |
| 2003/0100787 A1 | 5/2003 | Akbarali | |
| 2003/0158306 A1 | 8/2003 | Battiste et al. | |
| 2005/0113494 A1 | 5/2005 | Geuns-Meyer et al. | |
| 2012/0035305 A1 | 2/2012 | Zahalka et al. | |
| 2015/0122151 A1 | 5/2015 | Chatterjee et al. | |
| 2021/0292649 A1 | 9/2021 | Hill et al. | |

FOREIGN PATENT DOCUMENTS

| | | |
|---|---|---|
| CZ | 245205 | 11/1983 |
| DE | 2940548 | 4/1981 |
| EP | 0026893 | 4/1981 |
| EP | 0211663 | 2/1987 |
| EP | 0254348 | 1/1988 |
| EP | 0281189 | 9/1988 |
| EP | 0719824 | 7/1996 |
| EP | 1151034 | 9/2005 |
| EP | 1885787 | 2/2008 |
| EP | 2459575 | 7/2018 |
| FR | 2647800 | 12/1990 |
| GB | 1298248 A * | 11/1970 |
| GB | 2156360 | 10/1985 |

(Continued)

OTHER PUBLICATIONS

International Search Report and Written Opinion for PCT/EP2021/051888 dated Apr. 28, 2021, 10 pages.
Johnson et al, "No Dust Blends of additives: an overview of technical and commercial advantages associated with their use", Jan. 1, 2001 (Jan. 1, 2001), p. 14-21, Retrieved from the Internet: https://www.sciencedirect.com/science/article/pii/S1464391X01801860?via%3Dihub.
E. J. Routledge et al., The Journal of Biological Chemistry, "Structural Features of Alkylphenolic Chemicals Associated with Estrogenic Activity," Feb. 7, 1997, vol. 272, 3280-3288.

(Continued)

*Primary Examiner* — Katarzyna I Kolb

(74) *Attorney, Agent, or Firm* — Dority & Manning, P.A.

(57) ABSTRACT

The present invention concerns a non-dust blend comprising tris(2-t-butylphenyl) phosphite.

19 Claims, No Drawings

(56) References Cited

FOREIGN PATENT DOCUMENTS

| GB | 2227490 | 8/1990 | |
|----|---------|--------|---|
| JP | H08333477 | 12/1996 | |
| WO | WO2001070869 | 9/2001 | |
| WO | WO2006124018 | 11/2006 | |
| WO | WO-2011014529 A2 * | 2/2011 | ........... C07C 215/12 |

OTHER PUBLICATIONS

Routledge et al., Structural Features of Alkylphenolic Chemicals Associated with Estrogenic Activity, J. Biol. Chem. 1997, 272, No. 6, 3280-3288.

* cited by examiner

NON-DUST BLEND

The present invention relates to non-dust blends comprising a phosphite antioxidant. More specifically, the present invention relates to non-dust blends comprising tris(2-t-butylphenyl) phosphite. The non-dust blends of the present invention are used to stabilise polymers.

Phosphite antioxidants are used as processing stabilisers in polymers in multiple applications where the phosphite and associated degradation products can be extracted and lead to human exposure e.g. in food packaging and drinking water pipes.

Recent attention by regulatory authorities has focused on the degradation products, often referred to as non-intentionally added substances (NIAS). Since phosphites are hydrolytically labile (even those more hydrolysis-resistant phosphites) they will hydrolyse to a degree thus forming the respective alkylated phenol building blocks as degradation products. They will also oxidise to phosphates during the course of antioxidant protection. In particular, concern has been raised on the alkylated phenol building blocks with several of these materials now included on the EU substance of very high concern list or under scrutiny through the EU community rolling action plan (CoRAP). All those under review that have had concerns raised against them have one commonality in that they are all substituted in the para-position on the phenolic ring.

Sumpter et al (E. J. Routledge, J. P. Sumpter, J. Biol. Chem. 1997, 272, 3280-3288) published an in vitro assay in 1997 which clearly showed that para-substituted alkylphenols exhibit estrogenic (endocrine-disrupting) effects in the assay whilst the corresponding ortho- and meta-substituted species show no effects. Since most common phosphite antioxidants placed on the market today are derived from phenols which have at least one substituent in the para-position on the phenolic ring then it opens the possibility of future regulatory action on the degradants occurring.

A suitable alternative to para-substituted alkaryl phosphites, preferably an alternative having improved performance, would be desirable. Tris(2-t-butylphenyl) phosphite (TOTBP) (CAS 31502-36-0) has been identified by the inventors of the present invention as such an improved alternative.

TOTBP has a higher phosphorus content per gram of material (6.5%) than the industry-available para-substituted alkaryl phosphite, tris(2,4-t-butylphenyl) phosphite sold by SI GROUP under the tradename ALKANOX™ 240 (4.8%) and consequently, in principle may be used at a lower loading (up to about 25% lower) than such industry-available materials with equivalent antioxidative effect. Alternatively, superior polymer protection can be achieved when used at equal loading.

2-t-butyl phenol (2TBP, the precursor to TOTBP) does not have the same concerns on endocrine disruption effects as para-substituted butylphenols and is deemed to be a safer material for use.

TOTBP is disclosed in the art in the following terms.

EP 0026893 (counterpart DE 2490548) discloses a process for preparing crystalline TOTBP. The preparation involves the treatment of 2-t-butyl phenol with PCl$_3$, followed by de-gas and distillation to remove excess phenol, and finally crystallisation and recrystallisation from a liquid alcohol to give colourless crystals (m.pt 72° C.).

GB 2227490 discloses the preparation of many phosphite additives, including TOTBP. Preparation is by treatment of 2-t-butyl phenol with PCl$_3$ in the presence of aluminium trichloride under intense stirring for 6 hours at 72-74° C.

This is followed by distillation to remove excess PCl$_3$, and purification to give a yellow clear product which is said to have solidified at room temperature to give a glass-like solid product.

EP 0211663 discloses a stabilised polyolefin resin composition containing a phenolic compound and a phosphite compound which may be TOTBP. Many other phosphites are disclosed and the use of TOTBP is not exemplified.

EP 281189 and U.S. Pat. No. 4,957,956 relate to a solid stabilizer composition for synthetic polymers, the process for its preparation and its use in the stabilization of synthetic polymers. Many phosphites including TOTBP and A240 are mentioned. EP 278579 constitutes a similar disclosure.

EP 1151034 and US 2005/0113494, EP 1885787 and U.S. Pat. No. 7,135,511 disclose the use of a polyolefin combined with an arylalkyl phosphite with a triaryl phosphite and additional additives such as hindered phenols. TOTBP is mentioned amongst many as a suitable triaryl phosphite.

EP 2459575, US 2003/0158306 and U.S. Pat. No. 7,135,511 disclose a liquid phosphite composition combined with an ethanolamine-based amine of varying structure. The phosphite component comprises at least 2 phosphites. One of these may be TOTBP.

U.S. Pat. Nos. 4,187,212 and 4,290,941 refer to TOTBP amongst many phosphites in combination with a hindered phenol in PP or PE.

U.S. Pat. No. 4,348,308 discloses the use of stabiliser compositions including phosphites in PVC. A mentioned embodiment includes TOTBP but many of the disclosed compounds are 2-tert-butylphenyl compounds bearing a para (4-) tertiary butyl group.

U.S. Pat. No. 4,360,617 discloses TOTBP as being suitable for combination with a phenolic component to stabilise various polymers excluding PE and PP, but the disclosure emphasises phosphites having a 4- position substituent.

U.S. Pat. No. 4,829,112 discloses the combined use of hindered phenols derived from the reaction of dihydric alcohols with PP-BASE and a phosphite. TOTBP is specifically claimed as a suitable phosphite.

U.S. Pat. No. 5,487,856 discloses the use of TOTBP in the formation of a spinnable polyamide mixture by melt-mixing a fibre forming polyamide in addition to end group increasing amines/alcohols and water or mixtures thereof.

U.S. Pat. No. 8,048,946 discloses a composition comprising a mixture of phosphites which is a liquid at room temperature and an alkanolamine. TOTBP is named within the group of phosphites that may be selected.

U.S. Pat. No. 8,258,214 discloses a PE film stabilised with a mixture of two phosphites, one of which may be TOTBP.

U.S. Pat. No. 4,282,141 discloses the use of an additive composition for PVC comprising a diketone metal salt with an organic phosphite. TOTBP is included in the general description of what the phosphite may be. The general formula is included in the claims, but not specifically TOTBP.

GB 2227490 discloses stabilisers for polymeric substrates having a general formula which encompasses TOTBP.

U.S. Pat. No. 6,051,671 relates to a stabilization package that can comprise fillers, heat and light stabilizers, pigments and colours and nucleating agents. The secondary antioxidants are generally organophosphites, including triaryl phosphites, of which TOTBP is a named example.

EP 254348 discloses a process for preparing polymers or copolymers of thermostabilized α-olefins which comprises carrying out the polymerization in the presence of an antioxidant selected from organic phosphites, diphosphites, phosphonites and diphosphonites, including aryl phosphites having a general formula encompassing TOTBP, which is specifically named in the claims.

GB 2156360 discloses a transparent radiation-stable polypropylene resin composition which comprises a) a polypropylene resin; b) a sorbitol derivative; c) a specific phosphite compound; and d) a polyamine compound. The phosphite compound c) can be TOTBP.

U.S. Pat. No. 7,468,410 discloses a process for stabilizing a polyolefin comprising incorporating or applying to said polyolefin an effective stabilizing amount of a mixture of at least two different tris-(mono-alkyl) phenyl phosphite esters of a formula which encompasses TOTBP.

U.S. Pat. No. 3,644,536 describes a process for the preparation of 1,3,5-tris(α-hydroxyisopropyl) benzene which comprises heating at a temperature from 40° C. to 120° C. in an inert organic solvent, methyl butynol in the presence of a catalytic amount of nickel tetracarbonyl and an ortho-substituted aryl phosphite of structure $(R_nArO)_3P$, where Ar is an aryl radical selected from the group consisting of phenyl and napthyl, R is alkyl having one to six carbon atoms, cycloalkyl, or phenyl, and n is an integer of from zero to six, and the second ortho position of the aryl radical to the oxygen is unsubstituted.

U.S. Pat. No. 6,444,836 describes a process for manufacturing organic phosphites of at least 95.5 wt. % purity, comprising: reacting a hydroxyl-containing compound with a phosphorous compound, and desorbing residual hydroxyl-containing compound in the reaction product in a desorbing column employing an inert gas as a desorbing agent.

It will be seen that TOTBP is disclosed widely in the art as a polymer stabiliser but always in conjunction with many other and varied phosphites, often including para-substituted alkaryl phosphites. It has never been recognised in the art as being any more or less suitable than any other of the many organic phosphites commonly disclosed for antioxidative purposes. It has a relatively low melting point (72° C.) with attendant handling difficulties. It is manufactured in common with other organic phosphites by combining an alkylated phenolic starting material with phosphorus trichloride, specifically by adding the phosphorus trichloride to the alkylated phenolic starting material, a reaction which commonly results in some undesirable dealkylation and so, for a variety of reasons has not therefore been widely investigated.

Another consideration is the form in which the phosphite antioxidant is provided.

Antioxidant additives, including phosphite antioxidants, are often provided in powder form. However, there are several disadvantages associated with the use of antioxidant additives in powder form, notably the formation of dust. Dust particles can cause serious environmental health and safety issues—for example, the risk of dust particle inhalation which may be hazardous to health and the risk of explosion due to fine dust particles in the atmosphere.

Blends with low dust content are known in the art.

EP 0719824 describes low-dust granules of plastic additives, comprising at least 10% by weight of calcium stearate, where the water content of the calcium stearate is less than 2%, having a particle size distribution, in accordance with ISO 3435, of from 1 mm to 10 mm, a loose bulk density of greater than 400 g/l and a flowability in accordance with DIN 53492 of less than 15 s (tR25).

WO 01/70869 describes a composition consisting essentially of dried granules of an unmelted additive system comprising at least one sterically-hindered phenol, said dried granules having coherence and balanced hardness.

US 2015/122151 describes a method for preparing dust-free 100% additive blend pellets using melt extrusion, comprising blending two or more additives to produce an additive blend; feeding the additive blend to an extruder feed hopper, the said extruder having controlled temperature zones; controlling the temperature zones of the extruder so that at least one additive is melted; extruding a homogeneous mixture of additives from the extruder at a high throughput rate to produce partially or fully molten strands by passage through a die; and cooling followed by cutting the homogeneous strands of additive blend into solid pellets which are substantially dust-free.

US 2002/117651 describes a compacted particulate polymer additive composition in a dry granular form formed from the following components: (a) at least one particulate organic phosphite, organic phosphonite, and/or organic phosphonate, (b) one or more particulate polymer additives other than one of the components of (a); wherein the particles of said composition are held together in compacted dry granular form exclusively or substantially exclusively by contact with dried surfaces of in situ desolvated particles from particles of one or more at least partially solvated components of (a), and optionally by contact with dried surfaces of in situ desolvated particles from particles of one or more at least partially solvated components of (b).

FR 2647800 describes a tris(2,4-di-tert-butylphenyl) phosphite characterised in that it is coated using from 2% to 20% by weight with respect to its weight of a polyolefin wax or of a paraffin hydrocarbon wax.

However, none of these documents describe the use of TOTBP in the blends.

Consequently, this invention concerns the selection of TOTBP as a specifically suitable and improved alternative to para-substituted alkaryl phosphites and the provision of TOTBP in a non-dust blend. The inventors of the present invention have also found synergistic effects between TOTBP and certain other additives (such as other antioxidants) in a non-dust blend.

According to an aspect of the present invention, there is provided a non-dust blend comprising tris(2-t-butylphenyl) phosphite.

In this context, the term 'non-dust blend' means substantially dust-free granules.

For the avoidance of doubt, the term 'granules' covers pellets, chips, flakes, tablets, pastilles, fragments, particles and the like.

'Dust' in this context means material that passes through a sieve having 0.5 mm apertures.

By 'substantially dust-free' it is meant that there is little or no dust present in the granules. For example, the amount of dust may be less than 15%, less than 10%, less than 5%, less than 1%, less than 0.5%, or less than 0.1% by weight of the granules.

Preferably, the amount of dust in the non-dust blend is less than about 1%, less than about 0.5%, or less than about 0.1% by weight of the non-dust blend.

The low level of dust in the non-dust blend is advantageous for many reasons. For example, it reduces the risk of dust particle inhalation by personnel and reduces the risk of explosion due to fine dust particles in the atmosphere. In addition, there is reduced physical loss of the additive(s) in the form of dust, and decreased clumping and clogging up of machinery.

The non-dust blend may be absent of tris(2,4-di-t-butylphenyl) phosphite.

The non-dust blend may be absent of any aryl phosphite having a t-butyl group in the para-position with respect to the phosphite group.

The non-dust blend may be absent of any aryl phosphite having an alkyl group in the para-position with respect to the phosphite group.

In this context by 'absent of' it is meant present, if at all, only at de minimis levels.

By 'de minimis' it is meant below the level at which the absent compound would make a significant contribution to the phosphorus loading of the non-dust blend.

By 'below the level at which the absent compound would make a significant contribution to the phosphorus loading' it is meant contributing below 20% by weight, below 10% by weight, below 5% by weight, below 2% by weight, below 1% by weight, or about 0% or 0% by weight of the total phosphorus present in the non-dust blend.

It may be advantageous for the non-dust blend of the present invention to be absent any aryl phosphites having alkyl groups in the para-position with respect to the phosphite group, as when such phosphites hydrolyse they form the respective alkylated phenols as degradation products. Concerns have been raised in connection with many of these alkylated phenols substituted in the para-position on the phenolic ring, and several are now included on the EU substance of very high concern list.

As well as seeking to avoid the presence of aryl phosphites having alkyl groups in the para-position with respect to the phosphite group, it may also be advantageous for the non-dust blend to be absent of any dealkylated, particularly debutylated, aryl phosphites because of the risk of generating unwanted phenol as a by-product during the course of use of the non-dust blend.

Consequently, the non-dust blend may be absent of any di(2-t-butylphenyl) monophenyl phosphite.

Di(2-t-butylphenyl) monophenyl phosphite may arise through debutylation in the preparation of TOTBP, resulting in the unwanted generation of phenol (as well as t-butyl chloride side product). Phenol will then react with $PCl_5$ and 2TBP to generate di(2-t-butylphenyl) monophenyl phosphite as a reaction by-product.

Conventionally, in the process for forming TOTBP, the phosphorus trihalide is added to 2-t-butyl phenol in what is considered a 'standard addition'. However, the inventors of the present invention have surprisingly found that by adding 2-t-butyl phenol to the phosphorus trihalide in a 'reverse addition', the amount of debutylation is dramatically reduced and a high purity TOTBP product is obtained. The addition of 2-t-butyl phenol to the phosphorus trihalide has not previously been contemplated, likely due to safety concerns and the complexity of such an addition.

Thus, the non-dust blend may comprise tris(2-t-butylphenyl) phosphite obtainable or obtained by adding 2-t-butyl phenol to a phosphorus trihalide.

The phosphorus trihalide may be phosphorus trichloride ($PCl_3$).

The 2-t-butyl phenol may be added to the phosphorus trihalide by subsurface addition. Subsurface addition is used as a means of ensuring that the 2-t-butyl phenol is distributed uniformly within the phosphorus trihalide as the addition proceeds. This method of addition advantageously prevents the unwanted debutylation of 2-t-butyl phenol to phenol and, as a result, the loss of t-butyl chloride to the atmosphere.

The addition of 2-t-butyl phenol to the phosphorus trihalide may be conducted stepwise or continuously such that 2-t-butyl phenol is gradually added to a bulk quantity of the phosphorus trihalide.

The reaction temperature during addition of 2-t-butyl phenol to the phosphorus trihalide may be maintained at or below 150° C., at or below 125° C., at or below 100° C., or at or below 75° C., for at least a portion of the period of time during which the 2-t-butyl phenol is added to the phosphorus trihalide.

The term 'for at least a portion of the period' may mean at least 10%, at least 25%, or at least 50% of the period of time during which the 2-t-butyl phenol is added to the phosphorus trihalide.

The reaction temperature during addition of 2-t-butyl phenol to the phosphorus trihalide may be maintained at or below 150° C., at or below 125° C., at or below 100° C., or at or below 75° C. for some or all, preferably all, of the initial stages of addition of 2-t-butyl phenol to the phosphorus trihalide. The term 'initial stages' may mean the first 10%, the first 25%, or the first 50% of the period of time over which the 2-t-butyl phenol is added to the phosphorus trihalide.

The addition of 2-t-butyl phenol to the phosphorus trihalide may be conducted in the presence of a catalyst.

The addition of 2-t-butyl phenol to the phosphorus trihalide may be conducted in the presence of a catalyst having the formula $NR_1R_2R_3$ wherein $R_1$ is H or an optionally substituted hydrocarbyl group and $R_2$ and $R_3$, which may be the same or different, are both optionally substituted hydrocarbyl groups of carbon chain length >1, >2, >3, >4, >5, >6, >7, or 8. The hydrocarbyl groups may (each, any or all of them) be alkyl groups. The catalyst may be N,N-di-octylamine.

Additionally or alternatively, the addition of 2-t-butyl phenol to the phosphorus trihalide may be conducted in the presence of a catalyst having a cation and an anion, the cation having the formula $N^+R_1R_2R_3R_4$ wherein $R_1$ to $R_4$, which may be the same or different, are optionally substituted hydrocarbyl groups having >1, >2, >3 or 4 carbon atoms. The hydrocarbyl groups may (each, any or all of them) be alkyl groups. The catalyst may be tetrabutylammonium chloride.

The inventors of the present invention have surprisingly found that by adding 2-t-butyl phenol to the phosphorus trihalide in the presence of a catalyst, a high yield and high purity TOTBP product can be obtained.

Following addition of 2-t-butyl phenol to the phosphorus trihalide, the tris(2-t-butylphenyl) phosphite product may be obtained from a single crystallisation.

Crystallisation may be carried out using an alcoholic and/or a ketonic solvent.

The alcoholic solvent may be isopropanol.

The ketonic solvent may be methyl ethyl ketone.

Advantageously, the inventors of the present invention have found that a high purity TOTBP product, which may be absent of di(2-t-butylphenyl) monophenyl phosphite, can be obtained from a single crystallisation. No recrystallisation is required, unlike many of the prior art processes.

The tris(2-t-butylphenyl) phosphite may be substantially pure.

By 'substantially pure' it is meant the tris(2-t-butylphenyl) phosphite has a purity of at least about 98%, at least about 98.5%, at least about 99%, or at least about 99.5%.

The substantially pure tris(2-t-butylphenyl) phosphite may be produced by a single chemical reaction followed by a single crystallisation.

Here, the single chemical reaction comprises adding 2-t-butyl phenol to a phosphorus trihalide in the manner previously described.

As outlined above, the inventors of the present invention have surprisingly found that a high purity TOTBP product can be obtained with only a single crystallisation. Prior art processes have tended to require crystallisation followed by recrystallisation, for example in DE 2490548. Even with multiple crystallisation steps, the TOTBP products of the prior art have not achieved the purity or yield realised by the present invention.

The non-dust blend may additionally comprise one or more of:

i. a phenolic antioxidant;
    ii. a sulphur-containing antioxidant;
    iii. an aminic antioxidant;
    iv. a UV stabiliser;
    v. a metal carboxylate;
    vi. a clarifying agent and/or a nucleating agent;
    vii. a secondary inorganic antioxidant or reducing agent; and/or
    viii. an inorganic acid scavenger.

Overall, the non-dust blend of the present invention significantly improves the heat aging performance of a variety of polymers, particularly with regards to colour stability, even during prolonged or repeated heat exposure. In addition, it has been found that the non-dust blend of the present invention improves retention of melt flow properties and viscosity of a variety of polymers, even during prolonged or repeated heat exposure. These effects are most notable when the non-dust blend additionally comprises one or more of components i. to viii. listed above.

The presence of one or more of components i. to viii. may produce a synergistic effect with respect to the colour stability of a variety of polymers. More specifically, such a combination in the non-dust blend may cause a significant reduction in colour formation.

Preferably, the non-dust blend comprises a phenolic antioxidant and one or more of components ii. to viii.

As a specific example, the non-dust blend may comprise TOTBP, a phenolic antioxidant and an inorganic acid scavenger.

As a further specific example, the non-dust blend may comprise TOTBP, a phenolic antioxidant and a metal carboxylate.

The phenolic antioxidant, if present, may comprise one or more of a fully hindered phenolic antioxidant, a partially hindered phenolic antioxidant, a low-hindered phenolic antioxidant, and/or a non-hindered phenolic antioxidant.

In this context, by 'fully hindered' it is preferably meant that the phenolic antioxidant comprises substituent hydrocarbyl groups on both positions ortho to the phenolic —OH group, each of those substituent groups being branched at the $C_1$ and/or $C_2$ position, preferably at the $C_1$ position, with respect to the aromatic ring.

The fully hindered phenolic antioxidant, if present, may comprise tetrakismethylene(3,5-di-t-butyl-4-hydroxyhydrocinnamate) methane (ANOX™ 20-CAS 6683-19-8); 2,2'thiodiethylene bis[3(3,5-di-t-butyl hydroxyphenyl)propionate] (ANOX™ 70-CAS 41484-35-9); octadecyl 3-(3', 5'-di-t-butyl-4'-hydroxyphenyl) propionate (ANOX™ PP18-CAS 2082-79-3); 1,3,5-tris(3,5-di-t-butyl-4-hydroxybenzyl) isocyanurate (ANOX™ IC14-CAS 27676-62-6); 1,3,5-trimethyl-2,4,6-tris(3,5-di-t-butyl-4-hydroxybenzyl) benzene (ANOX™ 330 CAS 1709-70-2); N,N'-hexamethylenebis[3-(3,5-di-t-butyl-4-hydroxyphenyl)propionamide] (LOWINOX™ HD98-CAS 23128-74-7); 1,2-bis(3,5-di-t-butyl-4-hydroxyhydrocinnamoyl)hydrazine (LOWINOX™ MD24-CAS 32687-78-8); 2,2'-ethylidenebis[4,6-di-t-butylphenol] (ANOX™ 29-CAS 35958-30-6); butylated hydroxytoluene (BHT-CAS 128-37-0); and/or compatible mixtures of two or more thereof.

In this context, by 'partially hindered' it is preferably meant that the phenolic antioxidant comprises at least one substituent hydrocarbyl group ortho to the phenolic —OH group, only one of the or each substituent group being branched at the $C_1$ and/or $C_2$ position, preferably at the $C_1$ position, with respect to the aromatic ring.

The partially hindered phenolic antioxidant, if present, may comprise 1,3,5-tris(4-tert-butyl-3-hydroxy-2,6-dimethylbenzyl)-1,3,5-triazine-2,4,6-(1H, 3H, 5H)-trione (LOWINOX™ 1790-CAS 40601-76-1); triethyleneglycol-bis-[3-(3-t-butyl-4-hydroxy-5-methylphenyl)propionate] (LOWINOX™ GP45-CAS 36443-68-2); the butylated reaction product of p-cresol and dicyclopentadiene (LOWINOX™ CPL-CAS 68610-51-5); 2,2'-methylenebis(6-t-butyl methylphenol) (LOWINOX™ 22M46-CAS 119-47-1); ethylene bis[3,3-bis[3-(1,1-dimethylethyl)-4-hydroxyphenyl]butanoate] (CAS 32509-66-3); and/or compatible mixtures of two or more thereof.

In this context, by 'low hindered' it is preferably meant that the phenolic antioxidant comprises at least one substituent hydrocarbyl group ortho to the phenolic —OH group, none of those substituent groups being branched at the $C_1$ or $C_2$ position, preferably at the $C_1$ position, with respect to the aromatic ring.

In this context, by 'non-hindered' it is preferably meant that the phenolic antioxidant comprises no substituent hydrocarbyl groups ortho to the phenolic —OH group.

It is preferable for the non-dust blend to comprise a phenolic antioxidant, as the combination of a phenolic antioxidant with TOTBP provides good stabilisation to a range of polymers.

Particularly preferred phenolic antioxidants are tetrakismethylene(3,5-di-t-butyl-4-hydroxyhydrocinnamate) methane (ANOX™ 20-CAS 6683-19-8); and/or octadecyl 3-(3', 5'-di-t-butyl-4'-hydroxyphenyl) propionate (ANOX™ PP18-CAS 2082-79-3).

Liquid phenolic antioxidants can be tolerated in low amounts (for example below 5% by weight, or below 2% by weight, of the total weight of the non-dust blend) provided that formation of the non-dust blend is not affected. Such liquid phenolic antioxidants, if present, may comprise C13-C15 linear and branched alkyl esters of 3-(3'5'-di-t-butyl-4'-hydroxyphenyl) propionic acid (ANOX™ 1315-CAS 171090-93-0); C9-C11 linear and branched alkyl esters of 3-(3',5'-di-t-butyl-4'-hydroxyphenyl)propionic acid (NAUGARD PS48™-CAS 125643-61-0); tocopherol, tocopherol derivatives, tocotrienol and tocotrienol derivatives (Vitamin E e.g. DL α-tocopherol-CAS 10191-41-0); and/or compatible mixtures of two or more thereof.

The phenolic antioxidant, if present, may be present in the non-dust blend in an amount of from about 1 wt. % to about 80 wt. %, from about 10 wt. % to about 70 wt. %, from about 20 wt. % to about 60 wt. %, or from about 30 wt. % to about 50 wt. %, based on the total weight of the non-dust blend.

The non-dust blend may additionally comprise a further organic phosphite antioxidant. The further organic phosphite antioxidant, if present, may comprise any organic phosphite antioxidant other than TOTBP, for example distearylpentaerythritol diphosphite (WESTON™ 618-CAS 3806-34-6); 3,9-bis(2,6-di-tert-butyl-4-methylphenoxy)-2,4,8,10-tetraoxa-3,9-diphosphaspiro[5.5]undecane (CAS 80693-00-1); bis (2,4-dicumylphenyl) pentaerythritol diphosphite (CAS 154862-43-8); and/or compatible mixtures of two or more thereof.

Liquid organic phosphite antioxidants can be tolerated in low amounts (for example below 5% by weight, or below 2% by weight, of the total weight of the non-dust blend) provided that formation of the non-dust blend is not affected. Such liquid organic phosphite antioxidants, if present, may comprise tris(dipropyleneglycol) phosphite, $C_{18}H_{39}O_9P$ (WESTON™ 430-CAS 36788-39-3); poly(dipropyleneglycol) phenyl phosphite (WESTON™ DHOP-CAS 80584-86-7); diphenyl isodecyl phosphite, $C_{22}H_{31}O_3P$ (WESTON™ DPDP-CAS 26544-23-0); phenyl diisodecyl phosphite (WESTON™ PDDP-CAS 25550-98-5); heptakis (dipropyleneglycol) triphosphite (WESTON™ PTP-CAS 13474-96-9); and/or compatible mixtures of two or more thereof.

Preferably, the following organic phosphite antioxidants are excluded from the possible further organic phosphite antioxidants in the non-dust blend:

a. tris(2,4-di-t-butylphenyl) phosphite; and/or b. any arylphosphite having a t-butyl group in the para-position with respect to the phosphite group.

The organic phosphite antioxidant (including or consisting of TOTBP) may be present in the non-dust blend in an amount of from about 10 wt. % to about 100 wt. %, from about 20 wt. % to about 80 wt. %, or from about 30 wt. % to about 60 wt. %, based on the total weight of the non-dust blend.

The sulphur-containing antioxidant, if present, may have a sulphur group with the formula —$CH_2$—$(S)_x$—$CH_2$—, wherein x=1 or 2, and optionally wherein neither of the —$CH_2$— groups is directly bonded to an aromatic group.

Such stabilising components may have a greater stabilising effect compared to a stabilising antioxidative composition comprising a sulphur-containing antioxidant wherein one or both of the —$CH_2$— groups is directly bonded to an aromatic group, or wherein one or both of the sulphur atoms are directly bonded to an aromatic group, for example 2,4-bis-(n-octylthio)-6-(4-hydroxy-3,5-di-tert-butylanilino)-1,3,5-triazine (CAS 991-84-4).

The sulphur-containing antioxidant, if present, may have the formula R—$CH_2$—$(S)_x$—$CH_2$—R, wherein x=1 or 2, and wherein the or each R group, which may be the same or different, is or contains, independently, an aliphatic group. Where more than one such aliphatic group is present in either or each R group, the aliphatic groups may be the same or different.

The, each or any aliphatic group may be straight chain or branched chain and may be substituted with one or more functional groups.

The sulphur-containing antioxidant may comprise one or more thioether groups and one or more ester groups.

The sulphur-containing antioxidant, if present, may comprise dilauryl-3,3'-thiodipropionate (NAUGARD™ DLTDP-CAS 123-28-4); distearyl-3,3'-thiodipropionate (NAUGARD™ DSTDP-CAS 693-36-7); pentaerythritol tetrakis (β-laurylthiopropionate) (NAUGARD™ 412S-CAS 29598-76-3); 2,2'thiodiethylene bis[3(3,5-di-t-butyl-4-hydroxyphenyl)propionate] (ANOX™ 70-CAS 41484-35-9); dimyristyl thiodipropionate (CAS 16545-54-3); distearyl-disulfide (CAS 2500-88-1); and/or compatible mixtures of two or more thereof.

Additionally or alternatively, the sulphur-containing antioxidant may comprise one or more diphenyl thioethers, for example 4,4'-thiobis(2-tert-butyl-5-methylphenol) (LOWINOX™ TBM-6-CAS 96-69-5); and/or 2,2'-thiobis(6-t-butyl-4-methylphenol) (LOWINOX™ TBP-6-CAS 90-66-4).

Liquid sulphur-containing antioxidants can be tolerated in low amounts (for example below 5% by weight, or below 2% by weight, of the total weight of the non-dust blend) provided that formation of the non-dust blend is not affected.

Such liquid sulphur-containing antioxidants, if present, may comprise ditridecylthiodipropionate (NAUGARD™ DTDTDP (liquid)-CAS 10595-72-9).

The sulphur-containing antioxidant, if present, may be present in the non-dust blend in an amount of from about 1 wt. % to about 50 wt. %, from about 1 wt. % to about 40 wt. %, from about 1 wt. % to about 30 wt. %, from about 1 wt. % to about 20 wt. %, or from about 5 wt. % to about 15 wt. %, based on the total weight of the non-dust blend.

The aminic antioxidant, if present, may comprise acetone diphenylamine (AMINOX™-CAS 68412-48-6); reaction products of diphenylamine and acetone (BLE™-CAS 112-39-4); N,N'-diphenyl-p-phenylenediamine (FLEXAMINE™-CAS 74-31-7); benzeneamine, bis[4-(2-phenyl-2-propyl)phenyl]amine (NAUGARD™ 445-CAS 10081-67-1); poly(1,2-dihydro-2,2,4-trimethylquinoline) (NAUGARD™ Q-CAS 26780-96-1); dioctyldiphenylamine (OCTAMINE™-CAS 101-67-7); 1,4-benzenediamine, N,N'-mixed phenyl and tolyl derivatives (NOVAZONE™ AS-CAS 68953-84-4); N,N',N''-tris[4-[(1,4-dimethylpentyl)amino]phenyl]-1,3,5-triazine-2,4,6-triamine (DURAZONE™ 37-CAS 121246-28-4); N-isopropyl-N'-phenyl-1,4-phenylenediamine (FLEXZONE™ 3C-CAS 101-72-4); and/or compatible mixtures of two or more thereof, for example.

Liquid aminic antioxidants can be tolerated in low amounts (for example below 5% by weight, or below 2% by weight, of the total weight of the non-dust blend) provided that formation of the non-dust blend is not affected. Such liquid aminic antioxidants, if present, may comprise N-phenyl-, reaction products with 2,4,4-trimethylpentene (NAUGARD™ PS30-CAS 68411-46-1); N,N-bis-(1,4-dimethylpentyl)-p-phenylenediamine (FLEXZONE™ 4L-CAS 3081-14-9); diphenylamine (CAS 122-39-4); (1,3-dimethylbutyl)-N'-phenyl-p-phenylenediamine (CAS 793-24-8); and/or compatible mixtures of two or more thereof.

The aminic antioxidant, if present, may be present in the non-dust blend in an amount of from about 1 wt. % to about 50 wt. %, from about 1 wt. % to about 40 wt. %, from about 1 wt. % to about 30 wt. %, from about 1 wt. % to about 20 wt. %, or from about 5 wt. % to about 15 wt. %, based on the total weight of the non-dust blend.

The UV stabiliser, if present, may comprise a hindered amine light stabiliser (HALS) and/or a UV absorber.

The UV stabiliser, if present, may comprise butanedioic acid, 1,4-dimethyl ester, polymer with 4-hydroxy-2,2,6,6-tetramethyl-1-piperidineethanol (LOWILITE™ 62-CAS 65447-77-0); bis(2,2,6,6-tetramethyl-4-piperidyl) sebacate (LOWILITE™ 77-CAS 52829-07-9); poly[[6-[(1,1,3,3-tetramethylbutyl)amino]-1,3,5-triazine-2,4-diyl][2,2,6,6-tetramethyl-4-piperidiyl)imino]-1,6-hexanediyl[(2,2,6,6-tetramethyl-4-piperidiyl)imino]]) (LOWILITE™ 94-CAS 70624-18-9); 1,5,8,12-tetrakis[4,6-bis(N-butyl-N-1,2,2,6,6-pentamethyl piperidylamino)-1,3,5-triazin-2-yl]-1,5,8,12-tetraazadodecane (LOWILITE™ 19-CAS 106990-43-6); and/or compatible mixtures of two or more thereof.

Liquid UV stabilisers can be tolerated in low amounts (for example below 5% by weight, or below 2% by weight, of the total weight of the non-dust blend) provided that formation of the non-dust blend is not affected. Such liquid UV stabilisers, if present, may comprise bis(1,2,2,6,6-pentamethyl-4-piperidyl) sebacate (LOWILITE™ 92-CAS 41556-26-7).

The UV stabiliser, if present, may be present in the non-dust blend in an amount of from about 1 wt. % to about 80 wt. %, from about 10 wt. % to about 70 wt. %, from about 20 wt. % to about 60 wt. %, or from about 30 wt. % to about 50 wt. %, based on the total weight of the non-dust blend.

The metal carboxylate, if present, may comprise one or more of a metal stearate and/or a metal lactate. Preferably, the metal carboxylate comprises a metal stearate.

The metal stearate, if present, may comprise calcium stearate, zinc stearate, aluminium stearate, magnesium stearate, lithium stearate, sodium stearate, cadmium stearate, barium stearate and/or a mixture of two or more thereof.

The metal lactate, if present, may comprise sodium lactate, magnesium lactate, calcium lactate, zinc lactate and/or a mixture of two or more thereof.

The metal carboxylate, if present, may be present in the non-dust blend in an amount of from about 1 wt. % to about 50 wt. %, from about 1 wt. % to about 40 wt. %, from about 1 wt. % to about 30 wt. %, or from about 5 wt. % to about 25 wt. %, based on the total weight of the non-dust blend.

The clarifying agent and/or nucleating agent, if present, may comprise a metal benzoate and/or a sorbitol derivative. The metal benzoate, if present, may comprise sodium benzoate, magnesium benzoate, calcium benzoate, zinc benzoate and/or a mixture of two or more thereof.

The clarifying agent and/or nucleating agent, if present, may comprise bis(3,4-dimethylbenzylidene) sorbitol (CAS 135861-56-2); bis(4-propylbenzylidene) sorbitol (CAS 882073-43-0); 2,4,8,10-tetra(tert-butyl)-6-hydroxy-12H-dibenzo[d,g][1,3,2]dioxaphosphocin 6-oxide, sodium salt (CAS 85209-91-2); and/or compatible mixtures of two or more thereof.

The clarifying agent and/or nucleating agent, if present, may be present in the non-dust blend in an amount of from about 1 wt. % to about 50 wt. %, from about 1 wt. % to about 40 wt. %, from about 1 wt. % to about 30 wt. %, or from about 5 wt. % to about 25 wt. %, based on the total weight of the non-dust blend.

The secondary inorganic antioxidant, if present, may comprise one or more of a metal hypophosphite, a metal thiosulphate, a metal bisulphite, a metal metabisulphite and/or a metal hydrosulphite.

The metal of the hypophosphite, thiosulphate, bisulphite, metabisulphite and/or hydrosulphite may be an alkali metal and/or an alkaline earth metal. The alkali metal may be selected from lithium (Li), sodium (Na), and potassium (K). The alkaline earth metal may be selected from calcium (Ca) and magnesium (Mg).

The metal hypophosphite may be selected from compounds with the formula: $MPO_2H_2$. The metal thiosulphate may be selected from compounds with the formula: $M_2S_2O_3$. The metal bisulphite may be selected from compounds with the formula: $MHSO_3$. The metal metabisulphite may be selected from compounds with the formula: $M_2S_2O_5$. The metal hydrosulphite may be selected from compounds with the formula: $M_2S_2O_4$. In each case, M is an alkali metal cation. The alkali metal cation may be selected from lithium (Li), sodium (Na), and potassium (K).

The metal hypophosphite may be in anhydrous form i.e. an anhydrous metal hypophosphite. Alternatively, the metal hypophosphite may be in hydrated form i.e. a hydrated metal hypophosphite, for example a monohydrate metal hypophosphite. As well as hypophosphites there may also be mentioned as being suitable for use in the invention thiosulphates, bisulphites, metabisulphites and hydrosulphites. These may all be provided as metal salts such as alkali metal salts, for example. As with metal hypophosphites these may be provided in anhydrous form or as hydrates. For example, penta-hydrates of thiosulphate and dihydrates of hydrosulphite may be mentioned and other suitable materials may be apparent to the skilled person.

The secondary inorganic antioxidant, if present, may comprise sodium hypophosphite.

The secondary inorganic antioxidant, if present, may be present in the non-dust blend in an amount of from about 1 wt. % to about 50 wt. %, from about 1 wt. % to about 40 wt. %, from about 1 wt. % to about 30 wt. %, from about 1 wt. % to about 20 wt. %, or from about 5 wt. % to about 15 wt. %, based on the total weight of the non-dust blend.

The inorganic acid scavenger, if present, may comprise one or more of a metal oxide, a metal hydroxide, a metal carbonate, a metal carboxylate, a metal salt and/or a hydrotalcite-like compound such as hydrotalcite itself.

The inorganic acid scavenger, if present, may be present in the non-dust blend in an amount of from about 1 wt. % to about 50 wt. %, from about 1 wt. % to about 40 wt. %, from about 1 wt. % to about 30 wt. %, from about 1 wt. % to about 20 wt. %, or from about 5 wt. % to about 15 wt. %, based on the total weight of the non-dust blend.

Additional antioxidants, for example hydroxylamines or precursors thereof, lactone radical scavengers, acrylate radical scavengers and/or chelating agents, may be included in the non-dust blend.

According to another aspect of the present invention, there is provided a process for forming the non-dust blend as hereinbefore described comprising the steps of:

a. extruding or otherwise processing tris(2-t-butylphenyl) phosphite, optionally as part of a blend with one or more other additives, to provide a substrate;

b. cooling the substrate; and c. optionally fragmenting the cooled substrate.

Where TOTBP is provided as part of a blend with one or more other additives, there may be an additional step prior to step a. which involves mixing TOTBP with the one or more other additives to form a homogeneous blend. The mixing step may be carried out using any suitable equipment known in the art, for example, a horizontal plough shear, a horizontal ribbon blender, a vertical cone blender, a high shear mixer or the like.

For the avoidance of doubt, where reference is made to TOTBP in the following paragraphs, unless otherwise stated, this also covers blends of TOTBP with one or more other additives.

The substrate may for example be an extrudate or it may be a workable substrate formed, for example, by compression and/or partial or full melting and/or kneading the TOTBP.

The extrusion or otherwise processing of TOTBP may be carried out using an extruder, kneader and/or other melting and mixing device. The extruder may be a screw extruder, for example a twin screw extruder.

The extruder may comprise any number of heating zones, for example from 1 to 10 heating zones.

The temperature of the, any or all of the heating zones may be from about 30° C. to about 250° C., for example from about 40° C. to about 200° C. The temperature of the heating zone(s) will be dependent on the screw profile, such as the type, number and location of elements, for example transporting elements and kneading elements. The temperature of the heating zone(s) will also be dependent on the identity of the TOTBP/TOTBP blend being extruded.

The extruder may also comprise a die through which the TOTBP is forced, to form the substrate. Alternatively, the extruder may be run open die.

The process may additionally comprise the step of passing the substrate through a die face cutter to form granules of the substrate. This process step may occur between steps a. and b.

The inventors of the present invention have surprisingly found that during extrusion of TOTBP (or a blend containing TOTBP) it is crucial to control the temperature profiles of the heating zones preceding the die and the temperature profile of the die itself in order to produce a processable substrate i.e. a highly viscous, non-adhering paste.

In some instances, it has been found that the melt temperature at the die must not deviate by more than ±5° C. from the melt temperature of TOTBP (in this instance we mean TOTBP per se as opposed to a blend containing TOTBP). For example, this has been found to be the case where TOTBP is blended with the fully hindered phenolic antioxidant ANOX™ 20. This is surprising given that an equivalent formulation comprising the phosphite antioxidant ALKANOX™ 240 and the fully hindered phenolic antioxidant ANOX™ 20 has a much wider operational window— the melt temperature at the die can deviate by at least ±20° C. and still produce a processable substrate. Therefore, processes of the art cannot be used for the extrusion of TOTBP (or a blend containing TOTBP). The present invention overcomes the problem of how to extrude TOTBP (or a blend containing TOTBP) and produce a processable substrate. This is achieved by controlling the temperature profile, and the screw speed.

In other instances, where TOTBP is blended with a phenolic antioxidant having a lower melt temperature than TOTBP it may be preferable for the melt temperature at the die not to deviate by more than ±5° C. from the melt temperature of the phenolic antioxidant.

Thus, it may be the case that the melt temperature at the die should not deviate by more than ±5° C. from either the melt temperature of TOTBP per se or the melt temperature of the phenolic antioxidant if present, whichever melt temperature is lower.

The rotation speed of the extruder screw(s) may be any suitable speed for forming the extrudate. For example, the rotation speed of the extruder screw(s) may be from about 50 rpm to about 200 rpm, or from about 80 rpm to about 150 rpm.

Step b. involves cooling the substrate from step a. This may be carried out by passing the substrate to one or more cooling drums, a cooling belt, a fluidised vibratory cooler and/or another cooling device. By the end of step b. the substrate is cooled into either a plastic or solid state.

Where present, step c. involves fragmenting the cooled substrate.

Fragmentation may be carried out using any suitable equipment. Fragmentation may be carried out using a single piece or a combination of milling equipment.

Techniques by which fragmentation may be carried out include:

1. Impact fragmentation, in which the impact may be effected by a grinding tool or by other particles. Examples of suitable equipment include a pneumatic conveyer or a drum mill.
2. Shearing fragmentation, in which the force between two or more solid surfaces moving in opposing directions results in a shearing effect. There may be at least one fixed surface and at least one moving surface. Examples of suitable equipment include a hammer mill or a centrifugal mill.
3. Cutting fragmentation, which involves force between two or more surfaces. There may be at least one fixed cutting edge and at least one moving cutting edge. Examples of suitable equipment include a knife mill, a shredder or a cutting mill.
4. Pressure fragmentation, in which force is applied between two solid surfaces. The solid surfaces may be the surfaces of the grinding tool, or may be the surfaces of adjacent particles. Pressure is exerted by the grinding tool, which may be, for example, a jaw crusher.

By way of a non-limiting example, fragmentation may be carried out using first and second counter-rotating rollers, optionally where one or both rollers have profiled surfaces. The counter-rotation of the rollers helps force the substrate between the two rollers through a pinch point where it fragments.

The process may additionally comprise the step of removing dust by sieving. Sieves suitable for this purpose are well-known in the art.

Following sieving, the amount of dust in the non-dust blend may be less than about 1%, less than about 0.5%, or less than about 0.1% by weight of the non-dust blend.

Alternatively, the non-dust blend as hereinbefore described may be manufactured by the process of cold extrusion and compaction.

The cold extrusion may be performed using, for example, a KAHL™ mill or a California Pellet Mill (CPM™). The compaction may be performed using, for example, a FITZPATRICK™ roller compactor.

The non-dust blend formed from cold extrusion and compaction may be sieved to remove dust. Sieves suitable for this purpose are well-known in the art.

Following sieving, the amount of dust in the non-dust blend may be less than about 1%, less than about 0.5%, or less than about 0.1% by weight of the non-dust blend.

According to another aspect of the present invention, there is provided use of the non-dust blend as hereinbefore described to stabilise a polymer.

According to another aspect of the present invention, there is provided a stabilised polymeric composition comprising a polymer and the non-dust blend as hereinbefore described.

It should be understood that when the non-dust blend of the present invention is combined with a polymer to form a stabilised polymeric composition, it does not necessarily retain its granular form. Rather, the components of the non-dust blend may be homogeneously dispersed throughout the polymer.

The non-dust blend may be present in an amount of from about 0.01 wt. % to about 5 wt. %, from about 0.01 wt. % to about 2 wt. %, or from about 0.1 wt. % to about 1.5 wt. %, based on the total weight of the stabilised polymeric composition.

The polymer may comprise a polyolefin.

The polyolefin may comprise a homopolymer of ethylene, propylene, butylene or a higher alkene.

The ethylene homopolymer may comprise low density polyethylene (LDPE), linear low density polyethylene (LLDPE) and/or high density polyethylene (HDPE).

The ethylene homopolymer may be produced by a high-pressure radical polymerisation process or by a homogeneous or heterogeneous low-pressure process. Such processes may be catalysed by a Ziegler-Natta catalyst, a metallocene catalyst, a single-site catalyst, a chromium-based catalyst, and/or suitable combinations thereof. The ethylene homopolymer may be post-reactor modified and/or crosslinked.

The propylene homopolymer may be isotactic, syndiotactic or atactic.

The propylene homopolymer may be produced by a homogeneous or heterogeneous process. Such processes may be catalysed by a Ziegler-Natta catalyst, a metallocene catalyst, a single-site catalyst, and/or suitable combinations thereof. The propylene homopolymer may be visbroken and/or post-reactor modified.

Additionally or alternatively, the polyolefin may comprise a copolymer of ethylene, propylene, butylene, isobutylene, hexene, octene, acrylic acid, vinyl acetate, ethyl acrylate, and/or carbon monoxide. The copolymer may be a random copolymer or a block copolymer. For example, the polyolefin may comprise an ethylene/propylene block copolymer, an ethylene/propylene random copolymer, an ethylene/propylene/butylene random terpolymer or an ethylene/propylene/butylene block terpolymer.

The ethylene copolymer may comprise ultra-high molecular weight polyethylene (UHMWPE), HDPE, medium density polyethylene (MDPE), LLDPE, very low density polyethylene (VLDPE), ultra-low density polyethylene (ULDPE), ethylene-vinyl acetate (EVA), ethylene ethyl acrylate copolymer (EEA), ethylene acrylic acid copolymer (EAA), ethylene butyl acrylate copolymer (EBA), ethylene vinyl alcohol (EVOH), olefin block copolymer (OBC), ethylene-carbon monoxide copolymer (E/CO), and/or ethylene comprising plastomers and/or ionomers.

The ethylene copolymer may be produced by a high-pressure radical polymerisation process or by a homogeneous or heterogeneous low-pressure process. Such processes may be catalysed by a Ziegler-Natta catalyst, a metallocene catalyst, a single-site catalyst, and/or suitable combinations thereof. The ethylene homopolymer may be post-reactor modified and/or crosslinked.

The propylene copolymer may be produced by a homogeneous or heterogeneous process. Such processes may be catalysed by a Ziegler-Natta catalyst, a metallocene catalyst, a single-site catalyst, and/or suitable combinations thereof. The propylene copolymer may be visbroken and/or post-reactor modified.

Additionally or alternatively, the polymer may comprise ethylene-propylene-diene monomer (EPDM) copolymers, for example those formed with ethylene, propylene and diene comonomers such as ethylidene norbornene (ENB), dicyclopentadiene (DCPD), and vinyl norbornene (VNB) and/or suitable combinations thereof. The EPDM copolymers may be post-reactor modified and/or crosslinked.

Additionally or alternatively, the polymer may comprise a homopolymer of styrene, butadiene, isobutylene, isoprene, chloroprene, acrylonitrile; and/or copolymers thereof; and/or copolymers with ethylene, propylene, and/or butylene. For example, the polymer may comprise styrene-butadiene rubber (SBR), butadiene rubber (BR), high styrene rubber (HSR), nitrile rubber (NBR), styrene-butadiene-styrene (SBS), styrene-isoprene-styrene (SIS), chloroprene rubber (CR), styrene-ethylene/butylene-styrene (SEBS), styrene-ethylene/propylene (SEP), high impact polystyrene (HIPS), acrylonitrile-butadiene-styrene (ABS), styrene-acrylonitrile (SAN), and/or suitable combinations thereof.

Polymers such as polyurethanes, polyamides, polyesters, polycarbonates acrylics, polyvinyl chloride (PVC), and polymers of lactic acid may also be the subject of this invention.

The polymer may be in virgin form, in the form of industrial recycle, in the form of post-consumer recycle, and/or any suitable combinations thereof.

The polymer may be based on monomers synthesised from petrochemicals or other fossil feedstock. Additionally or alternatively, the polymer may be based on monomers synthesised from renewable feedstock, for example originating from vegetable or animal matter, or on chemically recycled monomers.

According to another aspect of the present invention, there is provided an article manufactured from the stabilised polymeric composition as hereinbefore described.

Compounds designated by the tradenames AMINOX™, ANOX™, BLE™, DURAZONE™, FLEXAMINE™, FLEXZONE™, LOWILITE™, LOWINOX™, NAUGARD™, NOVAZONE™, OCTAMINE™, and WESTON™ are available from SI Group USA (USAA), LLC, 4 Mountainview Terrace, Suite 200, Danbury, CT 06810.

For the avoidance of doubt, all features relating to the non-dust blend also relate, where appropriate, to the process for forming the non-dust blend, the use of the non-dust blend, and the stabilised polymeric composition and vice versa.

The invention will now by more particularly described with reference to the following, non-limiting examples.

EXAMPLES

Preparation of Non-Dust Blends Containing TOTBP

Example 1

A powder blend having the components identified in Table 1 was prepared.

TABLE 1

| Shorthand | Component | Manufacturer | Amount (wt. %) |
|---|---|---|---|
| ANOX ™ 20 | Tetrakismethylene (3,5-di-t-butyl-4-hydroxyhydrocinnamate) methane | SI Group | 40 |
| TOTBP | Tris(2-t-butylphenyl) phosphite | SI Group | 40 |
| DHT-4V | Magnesium aluminium hydrotalcite | Kasumi Chemicals | 20 |

10 kg of the powder blend was charged to a BRABENDER™ FW40 Plus feeder. The powder blend was introduced at a rate of 11 kg/hr into Zone 1 of a STEER™ MEGA 30 twin screw extruder. The powder blend was processed through the twin screw extruder set with a screw speed of 130 rpm, and the temperature conditions outlined in Table 2.

TABLE 2

| Extruder Zone | Temperature (° C.) |
|---|---|
| 1 | 50 |
| 2 | 80 |
| 3 | 75 |
| 4 | 75 |
| 5 | 70 |
| 6 | 65 |
| 7 | 60 |
| 8 | 70 |
| Die | 73 |
| Melt Temperature* | 73 |

*Melt temperature at die

The extrudate was passed through a die with a single row of four 3 mm diameter holes. The extruded strands were cooled on a stainless-steel belt and the cooled strands fragmented via pneumatic conveyance. The resultant material was passed through a 2-stage sieve tower (5 mm and 0.5 mm apertures) and the pellets falling within 5 mm to 0.5 mm constituted the non-dust blend granules.

Example 2

A powder blend having the components identified in Table 3 was prepared.

TABLE 3

| Shorthand | Component | Manufacturer | Amount (wt. %) |
|---|---|---|---|
| ANOX ™ 20 | Tetrakismethylene (3,5-di-t-butyl-4-hydroxyhydrocinnamate) methane | SI Group | 40 |
| TOTBP | Tris(2-t-butylphenyl) phosphite | SI Group | 40 |
| ZnSt | Zinc Stearate | Baerlocher | 20 |

10 kg of the powder blend was charged to a BRA-BENDER™ FW40 Plus feeder. The powder blend was introduced at a rate of 11 kg/hr into Zone 1 of a STEER™ MEGA 30 twin screw extruder. The powder blend was processed through the twin screw extruder set with a screw speed of 90 rpm, and the temperature conditions outlined in Table 4.

TABLE 4

| Extruder Zone | Temperature (° C.) |
|---|---|
| 1 | 50 |
| 2 | 75 |
| 3 | 75 |
| 4 | 70 |
| 5 | 70 |
| 6 | 55 |
| 7 | 60 |
| 8 | 70 |
| Die | 75 |
| Melt Temperature* | 72 |

*Melt temperature at die

The extrudate was passed through a die with a single row of four 3 mm diameter holes. The extruded strands were cooled on a stainless-steel belt and the cooled strands fragmented via pneumatic conveyance. The resultant material was passed through a 2-stage sieve tower (5 mm and 0.5 mm apertures) and the pellets falling between 5 mm and 0.5 mm constituted the non-dust blend granules.

Example 3

A powder blend having the components identified in Table 5 was prepared.

TABLE 5

| Shorthand | Component | Manufacturer | Amount (wt. %) |
|---|---|---|---|
| ANOX ™ 20 | Tetrakismethylene (3,5-di-t-butyl-4-hydroxyhydrocinnamate) methane | SI Group | 40 |

TABLE 5-continued

| Shorthand | Component | Manufacturer | Amount (wt. %) |
|---|---|---|---|
| TOTBP | Tris(2-t-butylphenyl) phosphite | SI Group | 40 |
| Talc | Talc (HTPC1) | IMI Fabi | 20 |

10 kg of the powder blend was charged to a BRA-BENDER™ FW40 Plus feeder. The powder blend was introduced at a rate of 11 kg/hr into Zone 1 of a STEER™ MEGA 30 twin screw extruder. The powder blend was processed through the twin screw extruder set with a screw speed of 110 rpm, and the temperature conditions outlined in Table 6.

TABLE 6

| Extruder Zone | Temperature (° C.) |
|---|---|
| 1 | 50 |
| 2 | 80 |
| 3 | 75 |
| 4 | 70 |
| 5 | 70 |
| 6 | 55 |
| 7 | 60 |
| 8 | 70 |
| Die | 75 |
| Melt Temperature* | 72 |

*Melt temperature at die

The extrudate was passed through a die with a single row of four 3 mm diameter holes. The extruded strands were cooled on a stainless-steel belt and the cooled strands fragmented via pneumatic conveyance. The resultant material was passed through a 2-stage sieve tower (5 mm and 0.5 mm apertures) and the pellets falling between 5 mm and 0.5 mm constituted the non-dust blend granules.

Example 4

Example 4 is a prophetic example.

A powder blend having the components identified in Table 7 is prepared.

TABLE 7

| Shorthand | Component | Manufacturer | Amount (wt. %) |
|---|---|---|---|
| ANOX ™ 20 | Tetrakismethylene (3,5-di-t-butyl-4-hydroxyhydrocinnamate) methane | SI Group | 40 |
| TOTBP | Tris(2-t-butylphenyl) phosphite | SI Group | 40 |
| CaSt | Calcium stearate | Faci | 20 |

10 kg of the powder blend is charged to a BRA-BENDER™ FW20 feeder. The powder blend is introduced at a rate of 1-2 kg/hr into a California Pellet Mill (CPM™) CL3 laboratory mill fitted with a die (hole diameter=3.2 mm; wall thickness=25.4 mm; effective path length=25.4 mm) and with the cutting blade positioned 5 mm from the die. The mill is operated at sufficient pressure and roller speed to affect pelletisation while maintaining the temperature of the discharged pellets below the melt point of TOTBP.

The resultant material is cooled and passed through a 2-stage sieve tower (5 mm and 0.5 mm apertures) and the pellets falling between 5 mm and 0.5 mm constitute the non-dust blend granules.

The invention claimed is:

1. A non-dust blend comprising granules comprising tris(2-t-butylphenyl) phosphite and one or more of:
  i. a phenolic antioxidant;
  ii. a sulphur-containing antioxidant;
  iii. an aminic antioxidant;
  iv. a UV stabiliser, optionally comprising a hindered amine light stabiliser (HALS) and/or a UV absorber;
  v. a metal carboxylate;
  vi. a clarifying agent and/or a nucleating agent;
  vii. a secondary inorganic antioxidant or reducing agent; and/or
  viii. an inorganic acid scavenger,
  wherein the tris(2-t-butylphenyl) phosphite has a purity of at least 98%.

2. The non-dust blend according to claim 1, wherein the amount of dust in the non-dust blend is less than about 1% by weight of the non-dust blend.

3. The non-dust blend according to claim 1, wherein the tris(2-t-butylphenyl) phosphite is obtainable or obtained by adding 2-t-butyl phenol to a phosphorus trihalide.

4. The non-dust blend according to claim 3, wherein the 2-t-butyl phenol is added to the phosphorus trihalide by subsurface addition.

5. The non-dust blend according to claim 3, wherein the addition of 2-t-butyl phenol to the phosphorus trihalide is conducted in the presence of a catalyst.

6. The non-dust blend according to claim 5, wherein the catalyst has the formula $NR_1R_2R_3$ wherein $R_1$ is H or an optionally substituted hydrocarbyl group and $R_2$ and $R_3$, which may be the same or different, are both optionally substituted hydrocarbyl groups of carbon chain length >1; and/or
  wherein the catalyst has a cation and an anion, the cation having the formula $N^+R_1R_2R_3R_4$ wherein $R_1$ to $R_4$, which may be the same or different, are optionally substituted hydrocarbyl groups having >1 carbon atoms.

7. The non-dust blend according to claim 1, wherein di(2-t-butylphenyl) monophenyl phosphite contributes below 1% by weight of the total phosphorus present in the non-dust blend.

8. The non-dust blend according to claim 1, comprising a phenolic antioxidant and one or more of components ii. to viii.

9. The non-dust blend according to claim 1, wherein the phenolic antioxidant comprises a fully hindered phenolic antioxidant.

10. The non-dust blend according to claim 9, wherein the fully hindered phenolic antioxidant comprises tetrakismethylene(3,5-di-t-butyl-4-hydroxyhydrocinnamate) methane; 2,2'thiodiethylene bis[3(3,5-di-t-butyl-4-hydroxyphenyl) propionate]; octadecyl 3-(3',5'-di-t-butyl-4'-hydroxyphenyl) propionate; 1,3,5-tris(3,5-di-t-butyl-4-hydroxybenzyl) iso-cyanurate; 1,3,5-trimethyl-2,4,6-tris(3,5-di-t-butyl-4-hydroxybenzyl)benzene; N,N'-hexamethylenebis[3-(3,5-di-t-butyl-4-hydroxyphenyl)propionamide]; 1,2-bis(3,5-di-t-butyl-4-hydroxyhydrocinnamoyl)hydrazine; 2,2'-ethylidenebis[4,6-di-t-butylphenol]; butylated hydroxytoluene; and/or compatible mixtures of two or more thereof.

11. The non-dust blend according to claim 1, wherein:
  the metal carboxylate comprises one or more of a metal stearate and/or a metal lactate;
  the clarifying agent and/or a nucleating agent comprises a metal benzoate and/or a sorbitol derivative;
  the secondary inorganic antioxidant comprises one or more of a metal hypophosphite, a metal thiosulphate, a metal bisulphite, a metal metabisulphite and/or a metal hydrosulphite; and/or
  the inorganic acid scavenger comprises one or more of a metal oxide, a metal hydroxide, a metal carbonate, a metal carboxylate, a metal salt and/or a hydrotalcite.

12. A process for forming the non-dust blend according to claim 1, comprising the steps of:
  a. extruding tris(2-t-butylphenyl) phosphite, and the one or more other additives, to provide a substrate;
  b. cooling the substrate; and
  c. optionally fragmenting the cooled substrate.

13. The process according to claim 12, wherein the extruder comprises a plurality of heating zones.

14. The process according to claim 12, wherein the extruder comprises a die maintained at a temperature which deviates by no more than ±5° C. from the melt temperature of tris(2-t-butylphenyl) phosphite.

15. The process according to claim 12, wherein the process additionally comprises the step of removing dust by sieving.

16. The process according to claim 12, wherein the extruding step comprises a cold extrusion and wherein the process additionally comprises compaction.

17. A stabilised polymeric composition comprising a polymer and the non-dust blend according to claim 1.

18. The stabilised polymeric composition according to claim 17, wherein the non-dust blend is present in an amount of from about 0.01 wt. % to about 5 wt. % based on the total weight of the stabilised polymeric composition.

19. An article manufactured from the stabilised polymeric composition according to claim 18.

* * * * *